UNITED STATES PATENT OFFICE.

GEORGE CHRISTENSON, OF JAMAICA, NEW YORK, ASSIGNOR TO H. W. JOHNS-MANVILLE COMPANY, A CORPORATION OF NEW YORK.

COMPOSITION OF MATTER FOR USE AS A SUBSTITUTE FOR LEATHER AND SIMILAR PURPOSES.

1,332,320.    Specification of Letters Patent.    Patented Mar. 2, 1920.

No Drawing.    Application filed March 27, 1918.   Serial No. 225,073.

*To all whom it may concern:*

Be it known that I, GEORGE CHRISTENSON, a citizen of the United States of America, residing at Jamaica, county of Queens, State of New York, have invented certain new and useful Improvements in Compositions of Matter for Use as a Substitute for Leather and Similar Purposes, of which the following is a specification.

My invention relates generally to artificial substitutes for leather and the like substances and more specifically comprises a piston packing ring made of such novel material.

The growing scarcity and increasing cost of leather have rendered the economic problem resulting from the necessity of procuring and maintaining packing rings for the millions of air brake pistons in daily use on railroads increasingly difficult. Moreover, even the best of leather does not form an ideal material for air-brake packings as it is somewhat porous and becomes so dry as to allow excessive leakage of air if insufficient oil is used. Also leather packings, even when new, will not always hold the air leakage down below the exacting requirements of the Interstate Commerce Commission's regulations, and soon deteriorate so that such requirements are not even approximately complied with after a short period of use.

After much experimentation and prolonged testing I have produced according to my present invention a composition of matter which is not only a satisfactory substitute for leather and similar materials for many purposes, but also will, when molded into packing rings for pistons, give results under all kinds of usage which are superior to those obtainable from the best of leather.

My invention is mainly based upon the discovery that ground sponge when intimately mixed with rubber, and suitable fillers (preferably mineral in character) will produce a particularly tough compound, durable under wear. Apparently the sponge is of a highly porous, skeletonized, filamentary structure which absorbs the fine rubber particles, and those of the fillers preferably used, forming a mechanical binder, or fibrous, retaining skeleton therefor. The result is a dense, tough mass which can be molded by pressure and heat, forming a tough flexible sheet or ring or other body. When sulfur is added and the mass vulcanized, during or after the molding process, the desirable qualities of the product are further increased. If graphite is added the surface of the body becomes self-lubricating.

While the above stated basic discovery can be utilized in a variety of ways, I have, so far, obtained the best results by substantially the following method of procedure in the manufacture of air-brake piston packing rings:

I take a body of Madeira fine Pará rubber and work the same upon calendering rolls in the manner usual in making rubber cement. During the working process I prefer to add (also in the manner customary in rubber cement making) white oxid of zinc, flowers of sulfur, infusorial earth and litharge in suitable proportions to form a commercial rubber cement, such as is now on the market.

As these mineral fillers are gradually added the mass generally tends to become too dry for satisfactory working on the rolls, and in such cases I add from time to time sufficient quantities of blown colza oil, or other suitable oil, to counteract any excessive drying-out tendency. This first step of working up the described mixture usually takes from one to two hours time. The grinding and mixing action of the rolls generates enough heat to keep the mass pliable, and it may be necessary to cool the rolls as by running water through them, to prevent the mass becoming heated to a point which would tend to vulcanize the rubber.

I also prepare a mixture of equal parts ground sponge and short asbestos fiber by dry-mixing the two materials in any suitable stirring device, and gradually add this asbestos-sponge mixture to the above described rubber mixture still being worked on the calendering rolls. To secure the best results, according to my present information, I work together in this manner equal parts of the last described asbesto-sponge mixture and the previously described rubber cement mixture. The whole operation of working up a given batch of the entire compound on a set of calendering rolls usually consumes from 2½ to 3 hours time. When sufficiently worked the mass can be pulled off the rolls in a continuous sheet of a thickness equal to the clearance between the rolls. From this sheet, rings, or gaskets, or other desired shapes can be cut and used in that condition for various purposes.

The mass is a fairly soft, tough, flexible body of practically no elasticity which can be easily molded under pressure to any desired shape. Its general characteristics can be varied somewhat according to the proportions of constituent materials used.

To secure the best results the material produced as above described should be vulcanized. This is preferably done by molding it to the desired shape and subjecting the molds containing the material to the proper degree and duration of heat and pressure. This greatly increases its hardness and somewhat reduces its flexibility.

In making piston packing, rings of the proper size are cut from the original sheet and molded into the preferred shape, such for instance as is shown and described in my Patent No. 1,273,738, dated July 23, 1918.

If a self-lubricating packing ring is desired I add to the mass on the calendering rolls about an ounce of graphite for every pound of material in the mass. This amounts to about 6% by weight. That is to say, if the mass on the rolls comprises 100 lbs. of the rubber cement mixture 50 lbs. of asbestos and 50 lbs. of sponge, I add 200 ounces of graphite, according to my present practice, when making the self-lubricating packing rings. Rings containing this amount of graphite have a very smooth, frictionless surface. They are harder than the rings in which no graphite has been used, but not so tough and flexible. When graphite is added as above an extra half hour's working of the mass on the rolls is needed to thoroughly incorporate the graphite in the mass.

The piston packing rings embodying my invention have a smooth surface and dense, non-porous body which forms the tightest possible joint with the cylinder wall. Their durability in use is phenomenal. I have subjected specimen rings to the action of more than 175,000 piston strokes in a testing air brake equipment without their showing any appreciable wear. The air leakage is so small that with a standard cylinder pressure for air brake practice barely enough fall of pressure occurs in half an hour to perceptibly change the gage reading.

Another advantage possessed by my invention is its resistance to the disintegrating action of oil and heat occurring in air brake practice. Some oil is always used in air brake cylinders to keep their interior surfaces from rusting, even if the packing itself is self-lubricating, and the use of much oil for keeping packing leathers soft has become almost second nature to airbrake men. Consequently any leather substitute which would deteriorate rapidly under the action of such oil would meet with great practical difficulties. To test out this matter I have boiled my improved packing rings in oil for three or four days at a time and found them much more resistant to the strong disintegrating action of such hot oil than any other built up packing known to me.

Another advantage of the invention results from the fact that there is no waste in the process of manufacture, as all scrap resulting from cutting up the sheets to form rings, before vulcanization, can be thrown back into other masses being worked on the calendering rolls, and incorporated therein.

A practical advantage results also, from the fact that no gasolene has to be used in the process, gasolene of the present day being a very costly and uncertain article.

Having described my invention, I claim:

1. A dense, non-elastic composition of matter comprising rubber, finely ground sponge and a considerable proportion of an inert filler intimately mixed together.

2. A dense, non-elastic composition of matter comprising rubber, finely ground sponge and a considerable proportion of an inert filler intimately mixed and vulcanized together.

3. A dense, non-elastic composition of matter comprising rubber, finely ground sponge and a considerable proportion of short fibered asbestos intimately mixed and vulcanized together.

4. A dense, non-elastic composition of matter having sufficient toughness, density and hardness to serve as a substitute for leather in the making of packing rings and other purposes, which comprises rubber, asbestos and finely ground sponge, intimately mixed with sulfur and vulcanized together, the rubber constituting a minor proportion by weight of the entire mass.

5. A composition such as set out in claim 4 containing in addition about 6 per cent. of graphite.

6. A dense, non-elastic composition of matter comprising rubber, white oxid of zinc, sulfur, infusorial earth, litharge, oil, finely ground sponge and short asbestos fiber intimately mixed and vulcanized together.

7. A dense, non-elastic composition of matter comprising rubber, white oxid of zinc, sulfur, infusorial earth, litharge, oil, finely ground sponge, graphite, and short asbestos fiber intimately mixed and vulcanized together.

8. A dense, non-elastic composition of matter which comprises approximately 100 parts by weight of a mixture of pure rubber with sulfur, substantially the herein specified proportions of oil and hardening materials known as accelerators employed in making rubber cements, 50 parts of short asbestos fiber and 50 parts of finely ground sponge, intimately mixed and vulcanized together.

9. A dense, non-elastic composition of matter which comprises approximately 100 parts by weight of a mixture of pure rubber with sulfur, substantially the herein specified proportions of oil and hardening materials known as accelerators employed in making rubber cements, 50 parts of short asbestos fiber and 50 parts of finely ground sponge, together with graphite to about 6 per cent. of the weight of the mass, intimately mixed and vulcanized together.

GEORGE CHRISTENSON.